(12) United States Patent
Williams

(10) Patent No.: US 7,084,899 B2
(45) Date of Patent: Aug. 1, 2006

(54) CABLE WITH BUILT IN-FRAME GRABBER FOR A DENTAL VIDEO CAMERA

(76) Inventor: Ronald R. Williams, 3512 Manzana Ct., Camino, CA (US) 95709

( * ) Notice: Subject to any disclaimer, the term of this patent is extended or adjusted under 35 U.S.C. 154(b) by 119 days.

(21) Appl. No.: 10/059,079

(22) Filed: Jan. 28, 2002

(65) Prior Publication Data

US 2003/0142206 A1    Jul. 31, 2003

(51) Int. Cl.
*H04N 7/18* (2006.01)
(52) U.S. Cl. .......................................... 348/66; 348/75
(58) Field of Classification Search ............. 348/66–75
See application file for complete search history.

(56) References Cited

U.S. PATENT DOCUMENTS

| | | | |
|---|---|---|---|
| 5,429,502 A * | 7/1995 | Cooper et al. | 433/29 |
| 6,019,721 A * | 2/2000 | Holmes et al. | 600/167 |
| 6,761,561 B1 * | 7/2004 | Mandelkern et al. | 433/29 |
| 2002/0067407 A1 * | 6/2002 | Cooper | 348/66 |

* cited by examiner

*Primary Examiner*—Anand Rao
(74) *Attorney, Agent, or Firm*—W. Edward Johansen

(57) ABSTRACT

A cable assembly for a dental video camera system includes a dental video camera with a camera cable and a camera connector, a monitor with a monitor cable and a monitor connector and a power supply with power supply cable and a power supply connector. The cable assembly also includes an input housing, a camera cable with a complement-camera connector and a first connector. The camera cable is electrically coupled to the first connector. The complement camera connector that electrically couples the dental video camera through the camera connector to said camera cable. The cable assembly also an output housing with a complement-monitor connector, a complement-power supply connector and a complement-first connector. The complement-monitor connector and the complement-power supply connector are disposed in the output housing and the complement camera connector electrically couples the dental video camera through the camera connector to the camera cable.

3 Claims, 6 Drawing Sheets

CABLE WITH BUILT IN-FRAME GRABBER FOR A DENTAL VIDEO CAMERA

BACKGROUND OF THE INVENTION

The field of the invention is dental video cameras with a frame grabber that is an image capturing apparatus.

U.S. Pat. No. 6,305,933 teaches the use of a frame grabber that is image acquisition hardware that is Alaris quick video transport. This results in a sampled color of 24 bits being stored on the personal computer. It has an S-Video input to match the output from the dental video camera to provide the best possible results by using the best signal output from the dental video camera. The software uses a Twain protocol interface to grab images from the video dental camera using the frame grabber. A standard software interface allows other dental video cameras and frame grabbers to be tested without the need for a change of software.

U.S. Pat. No. 6,317,152 teaches a digital video recording system that includes a processor and a digital video camera that is directed at a scene of interest to continuously view the scene and generate video images of the scene at a predetermined frame rate. A frame grabber converts the images to digital signal. The processor processes the signals and compares the video image that is represented by a digital signal with a previously established reference of the scene to determine if changes have occurred. The processor has a memory in which contents of each digital signal are stored, together with the time and date information as to when the image was acquired.

U.S. Pat. No. 6,015,088 teaches a process that allows a frame grabber to be integrated with a personal computer to continuously display a video image of the imaging apparatus. Upon proper input by a user, or automatically after a timed interval, a snapshot of the video image is captured. An auto-discrimination process of the captured video image automatically decodes any bar-coded information present in the captured image and outputs the information. An imaging assembly is provided for receiving an image of an object T and generating an electrical output signal indicative of the data optically encoded thereon, if any. The imaging assembly may include an image sensor 14, such as a 1D or 2D CCD or MOS solid state image sensor together with an imaging optics assembly for receiving and focusing an image of the object T onto a substrate of the image sensor. Particular assemblies of this type are described in U.S. Pat. No. 4,755,873 and U.S. Pat. No. 4,651,202. The imaging device also includes electronics that allows interfacing with a frame grabber that interfaces directly with a computer that may be a Compaq Pentium 120 based personal computer. The frame grabber is a Flashpoint Lite that is manufactured by Integral Technologies, Inc. The personal computer includes a microprocessor which is a programmable control device that is able to receive, output and process data in accordance with a stored program that is maintained within either or both of a read/write random access memory and a hard drive.

U.S. Pat. No. 6,186,944 teaches a dental/medical instrument for use in diagnostic and related patient inspection/examination that includes a body having an integral speculum with a video image capture device or camera, a power supply and a video display. These components, in addition to user actuatable controls, are disposed integrally with the body. The body is adapted for convenient engagement and manipulation by a user's hand to provide a unitary, handheld device capable of illuminating and capturing an image of a patient and displaying the image.

U.S. Pat. No. 6,093,019 teaches a dental imaging system that extracts still images from a digital movie of a patient's mouth. The system allows still images free of shakes or flutter to be taken using an intra-oral camera at the desired angle more easily than using conventional still image capture systems which may require several retakes before realizing a flutter-free image at the correct angle. A general purpose personal computer of the Windows and Intel or of the Apple MacIntosh.™. variety. More specialized machines such as image processing-type workstations can also be used. The Wintel personal computer can feature an Intel Pentium processor running a Microsoft Windows graphical user interface. The hardware may be centered around a Peripheral Components Interconnect bus. The processor, program memory normally include semiconductor random access memory, display, mass storage device, such as a magnetic and/or optical disk drive, and a motion image capture device, such as a digital video capture card or board. The video capture card can be one that supports Microsoft's Video for Windows suite of imaging and graphics protocols. The video capture card is coupled to the image detecting device being, for instance, an intra-oral camera, via an analog signal interface such as one that supports the industry standard S Video output. The video capture card will have the proper hardware (including logic circuitry and/or a programmed processor) to interface with the intra-oral camera and to implement the function of an image frame grabber as known to those skilled in the art. The intra-oral camera has an optical system and image sensor technology that are suitable for obtaining acceptable quality images of a patient's mouth and teeth for dental diagnosis purposes, as known to those skilled in the art. The needed software for orchestrating image capture, display, and storage can be written using different programming languages and tools, such as the C language and the Microsoft Windows Application Programming Interface.

U.S. Pat. No. 6,190,309 teaches a video scope that has an entry section and a grip section. The entry section can advance into an object. The grip section is disposed at the back of the entry section and to be held by an operator. The video scope includes a light-reflecting body, an objective-lens, a solid-state image-pickup device, a light source, a window of incidence for image pickup rays and illumination windows that are located in the vicinities of the window of incidence. A power source is disposed in the grip section for driving the light source. A portable accommodation case has an accommodation space for accommodating the video scope. A lid has a thin display attached thereto and can rotate freely and stop at an optional position. The thin display is capable of displaying an image that is picked up by the video scope.

U.S. Pat. No. 5,908,294 teaches a hand-held dental video camera which includes a window for receiving light. In some aspects of the invention, a lamp is mounted distally beyond the window and aimed to illuminate a subject. A white light emitting diode is used to illuminate the subject.

U.S. Pat. No. 5,523,782 teaches a video dental camera that includes a light source, a charge coupled device and an adjustable focus lens system.

U.S. Pat. No. 5,429,502 teaches a dental camera that uses an external light source and route the light from the source to the head using fiber optics. In this arrangement the optical fibers travel through the cable and through the body of the handheld camera unit thereby resulting in a stiffer cable reducing maneuverability and a thicker handheld unit. The fiber optic connections require a complex and expensive connector as compared to fully electrical connectors. Using fiber optics to illuminate the subject requires increased power because some of the light energy is lost in the optical fiber.

There are imaging devices that use lamps at the end of the imaging head instead of fiber optics. These lamps have not been used in configurations that minimize the thickness of the instrument. The lamps in the dental camera of U.S. Pat. No. 5,523,782 are positioned axially away from the imaging window. The lamp in the dental camera of U.S. Pat. No. 4,575,805 is positioned on the proximal side of the imaging window. Both of these configurations result in relatively thick instruments. The lamps that are used in previous imaging devices had significant shortcomings.

U.S. Pat. No. 5,124,797 teaches a video-imaging camera that has a detachable distal module that is replaceable with one of different characteristics and is able to be sterilized. A non-replaceable charge coupled device and a video transmitter are connected to an inner body that includes a lens tube. The module includes an outer body encasing the inner body. The inner body may have a filter at its tip and a magnifying lens optically connected to an image conduit optical segment. The inner body receives an image conduit. The lens focuses the output of the image conduit and is disposed in the inner body on a charge coupled device microprocessor. The model may be replaced with an angular distal end or lenses of different fields of view. Fiber optic light filaments may be used to illuminate the field of view of the tip of the module, either housed internally or externally of the inner body.

U.S. Pat. No. 5,296,944 teaches an image scanner that includes a light source. The light source illuminates an original document. An image sensor receives a reflected light from the original document and converts the same into an output signal of image data. A device relatively moves the original document and the image sensor. An iris mechanism is provided on an optical path between the original document and the image sensor. A reference reflection plane is provided such that a light from the light source is reflected and the reflection light becomes incident on the image sensor. A comparing circuit compares a level of an output signal from the image sensor with a reference level when the image sensor receives the light from the reference reflection plane. A device for corrects a dynamic range of the image scanner by controlling the iris mechanism on the basis of the compared output.

U.S. Pat. No. 4,915,626 teaches a dental video camera which is used to view an image of the interior of the mouth of a patient. The dental video camera displays contemporaneously a video image of the interior of the mouth.

U.S. Pat. No. 4,589,404 teaches a laser endoscope that includes a video camera and an optical system. The video camera transmits an image through the optical system.

U.S. Pat. No. 4,600,939 and U.S. Pat. No. 4,639,772 teach a highly compact video camera which includes an optical system and which is able to be focused, a sensor-converter and a video electronic processing circuit. The sensor-converter receives an optical image passing through the optical system and converts the optical image to an unprocessed video signal. The video electronic processing circuit processes the unprocessed video signal.

U.S. Pat. No. 5,527,261 teaches a hand-held, fully remote diagnostic instrument having video capability which is configured for any one of a number of clinical or industrial applications. The instrument has a casing that includes a hand-held body portion, a neck portion that extends from the body portion to a head portion that is formed of a back cover, a front cover, and a sealing gasket to form an instrument that may be fully soaked. A circuit board assembly in the body portion contains video processing circuitry and a flexible neck board. The neck board extends forward from the body portion through the neck portion of the casing to a headboard located in the head portion of the casing. A solid-state imager and a miniature lamp are disposed on the headboard. The front cover contains an adjustable focus lens cell for focusing on the imager an image of a target in the field of view of the lens cell. The instrument can be configured for various applications by installing front and back covers that are suited for a specific purpose. The instrument can thus be used as a dental camera. The instrument provides a monitor-ready, standard format, full color video signal to a remotely located monitor.

The applicant hereby incorporates the above referenced patents into his application.

SUMMARY OF INVENTION

The present invention is generally directed to a dental video camera system. The dental video camera system includes a monitor, a cable and a dental video camera. The dental video camera includes a housing, a focusing lens, a light source and a charge coupled device camera system. The focusing lens and the charge coupled device camera system are disposed in the housing. The light source is disposed at the distal end of the elongated cavity of the housing. The cable couples the dental video camera to the monitor. The dental video camera also includes a mechanism that adjusts the charge coupled device camera system between a near field of focus and a far field of focus.

In a first separate aspect of the present invention, the cable includes a built-in frame grabber.

In a second separate aspect of the present invention, the cable includes a built-in camera power supply.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE PREFERRED EMBODIMENTS

Figure 1:
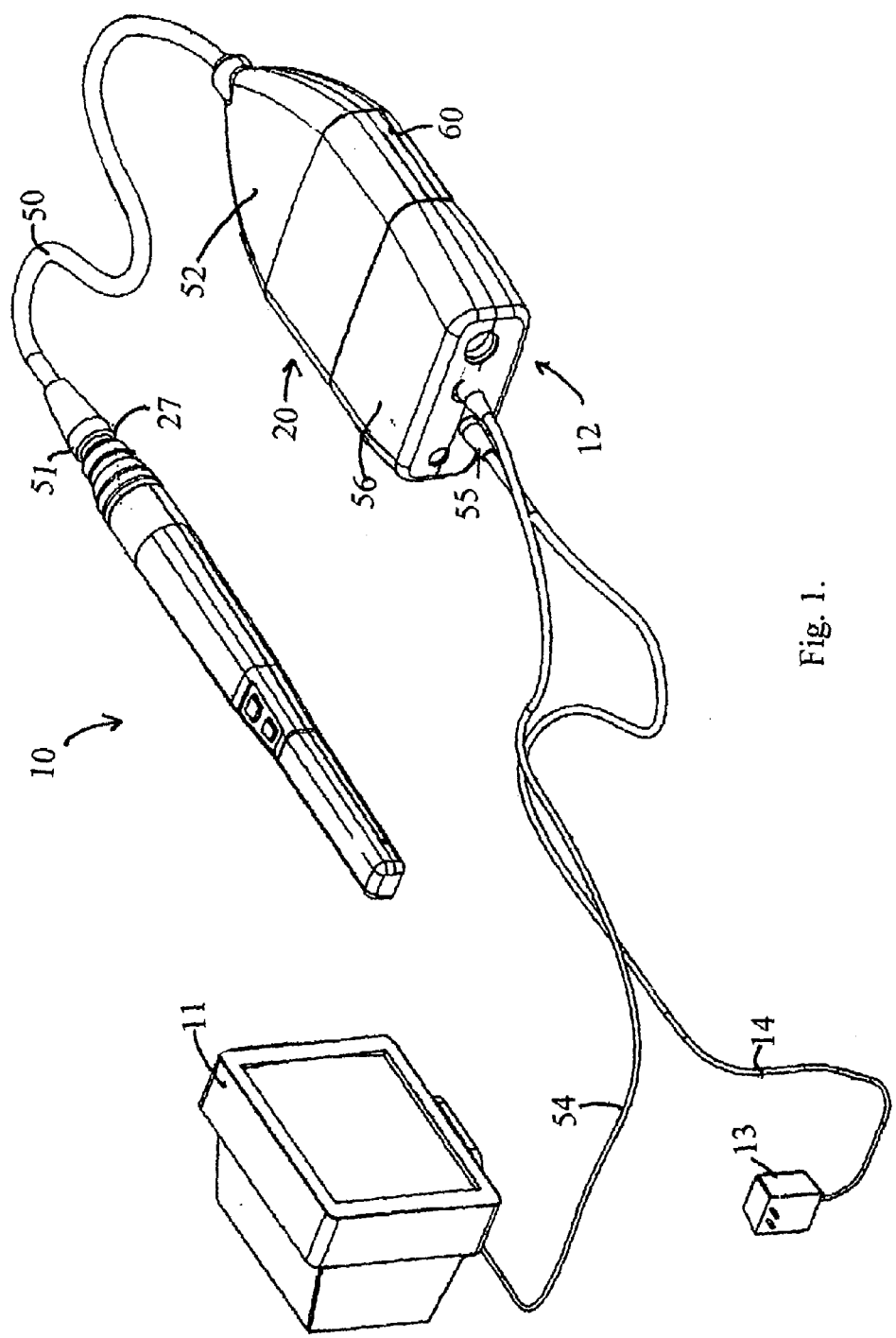
FIG. 1 is a perspective drawing of a dental video camera system that includes a dental video camera, a monitor, a cable-assembly with a built-in frame grabber and a camera power supply according to the present invention.
Figure 2:
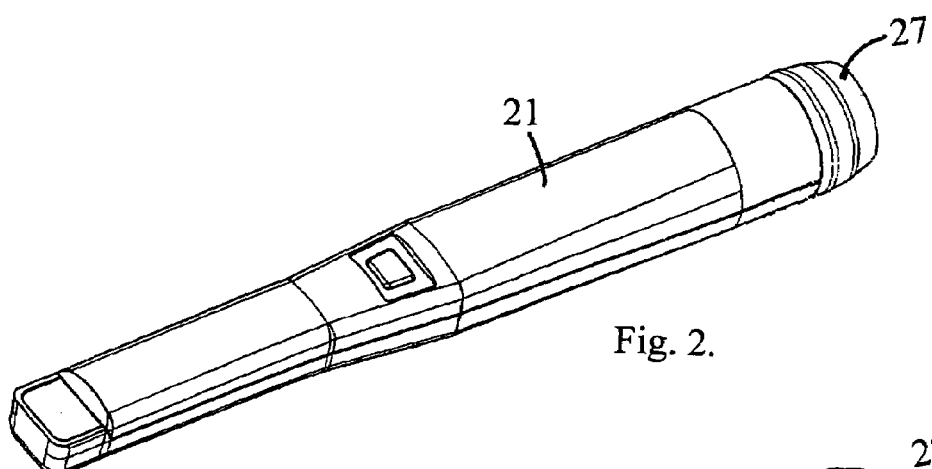
FIG. 2 is a top perspective view of the dental video camera of FIG. 1.

Referring to FIG. 1 in conjunction with FIG. 2 a dental video camera system 10 includes a monitor 11, a cable assembly 12, a power supply 13, a power supply cable 14 with a power supply connector 15. The dental video camera system 10 also includes a dental video camera 20. The cable assembly 12 couples the dental video camera 20 to the monitor 11. The cable assembly 12 may also couple the dental video camera 20 to either a computer or a printer.

Figure 3:
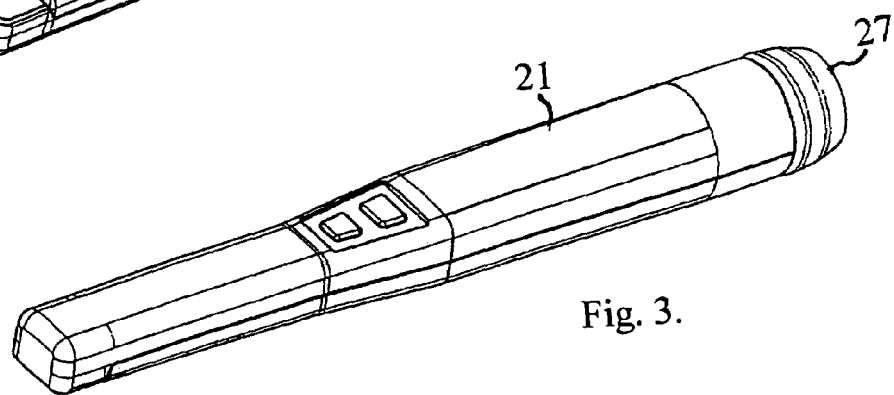
FIG. 3 is a bottom perspective view of the dental video camera of FIG. 1.
Figure 4:
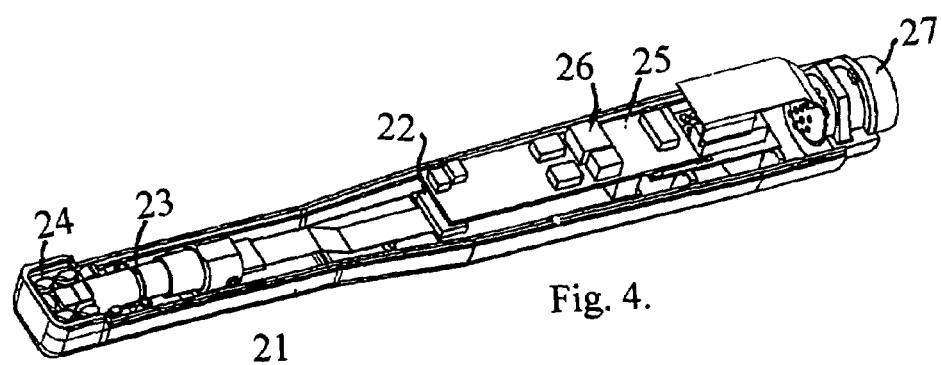
FIG. 4 is a side elevation in cross-section of the dental video camera of FIG. 1 that includes a focused camera assembly with a charge-coupled device and a cable connector assembly.

Referring to FIG. 2 in conjunction with FIG. 3 and FIG. 4 the dental video camera 20 includes housing 21. The dental video camera 20 also includes an adjustably focusing lens and a charge-coupled device (CCD) camera system 22, an iris 23, a plurality of light emitting diodes 24, a circuit board 25 with a video-processing circuitry 26 and a camera connector 27. The housing 21 has an elongated cavity with a distal end and a proximal end. The adjustably focusing lens and CCD camera system 22 is disposed within the elongated cavity of the housing 21. The adjustably focusing lens and CCD camera system 22 provides a focusing adjustment between a near field of focus and a far field of focus. The iris 23 may be adjustable optically and is mechanically coupled to the adjustably focusing lens and CCD camera system 22. If the iris 23 is adjustable, it may be a stretchable disc of material with a center pinhole that is a slidable portion of the adjustably focusing lens and CCD camera system 22. The iris adjusts between a nearly closed opening and a wide open opening in response to the focusing adjustment between the near field of focus and the far field of focus. There may be a fixed focusing lens system optically which may be coupled to the adjustable CCD camera system 22 and which is disposed in the elongated cavity of the housing 21.

Figure 5:
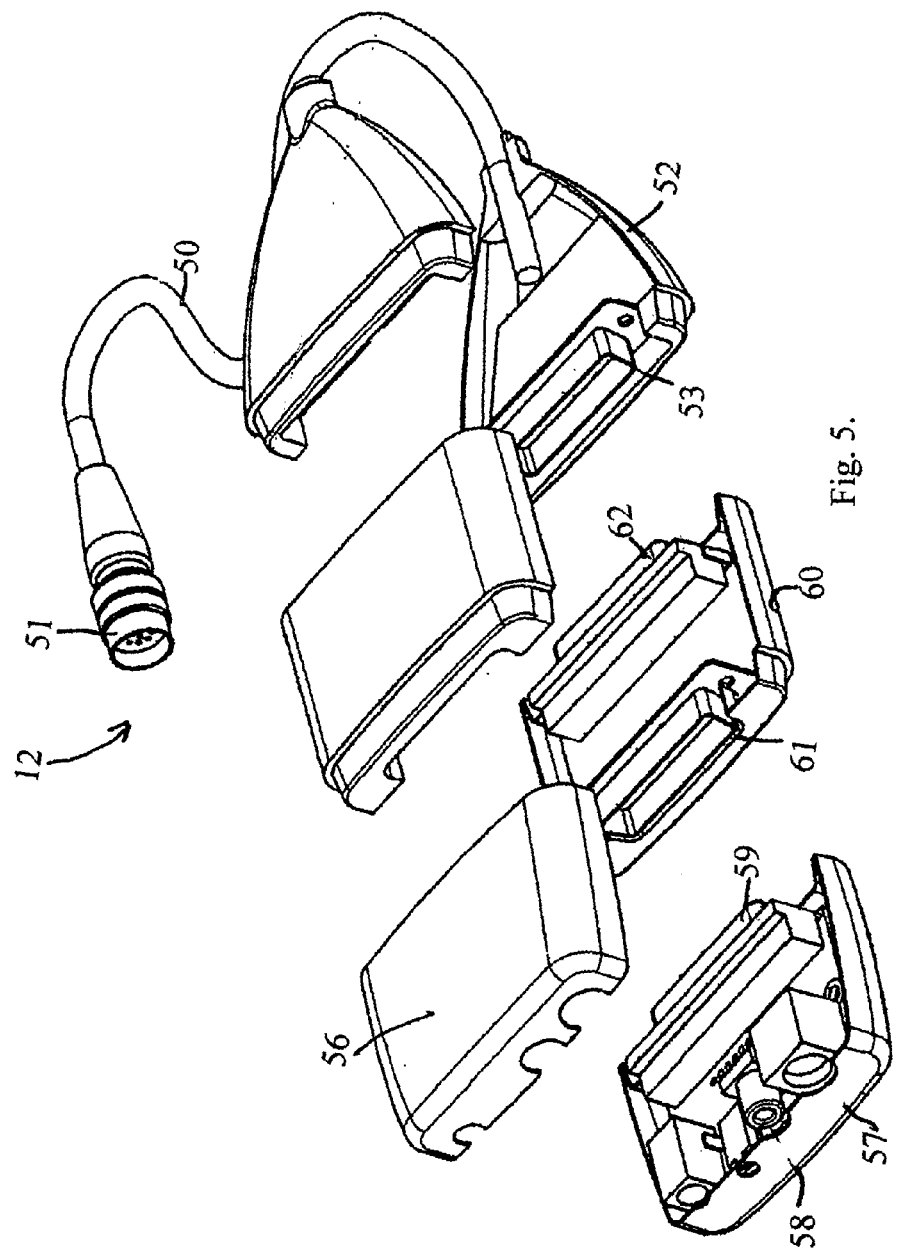
FIG. 5 is an exploded perspective view of the built-in frame grabber of the cable assembly of FIG. 1.

Referring to FIG. 5 in conjunction with FIG. 1 the cable assembly 12 includes a camera cable 50 with a complement camera connector 51, an input housing 52, a first connector 53. The first connector 53 is disposed in the input housing 52. The camera connector 51 electrically couples the dental video camera 20 through the camera connector 27 to the camera cable 51. The camera cable 51 is electrically coupled to the first connector 53. The cable assembly 12 also includes a monitor cable 54 with a monitor connector 55, an output housing 56, a complement-monitor connector 57, a complement-power supply connector 58 and a complement-first connector 59. The complement-monitor connector 56 and the complement-power supply connector 57 are disposed in the output housing 55. The complement camera connector 51 electrically couples the dental video camera 20 through the camera connector 27 to the camera cable 51. The monitor cable 54 is electrically coupled to the monitor 11.

Figure 6:
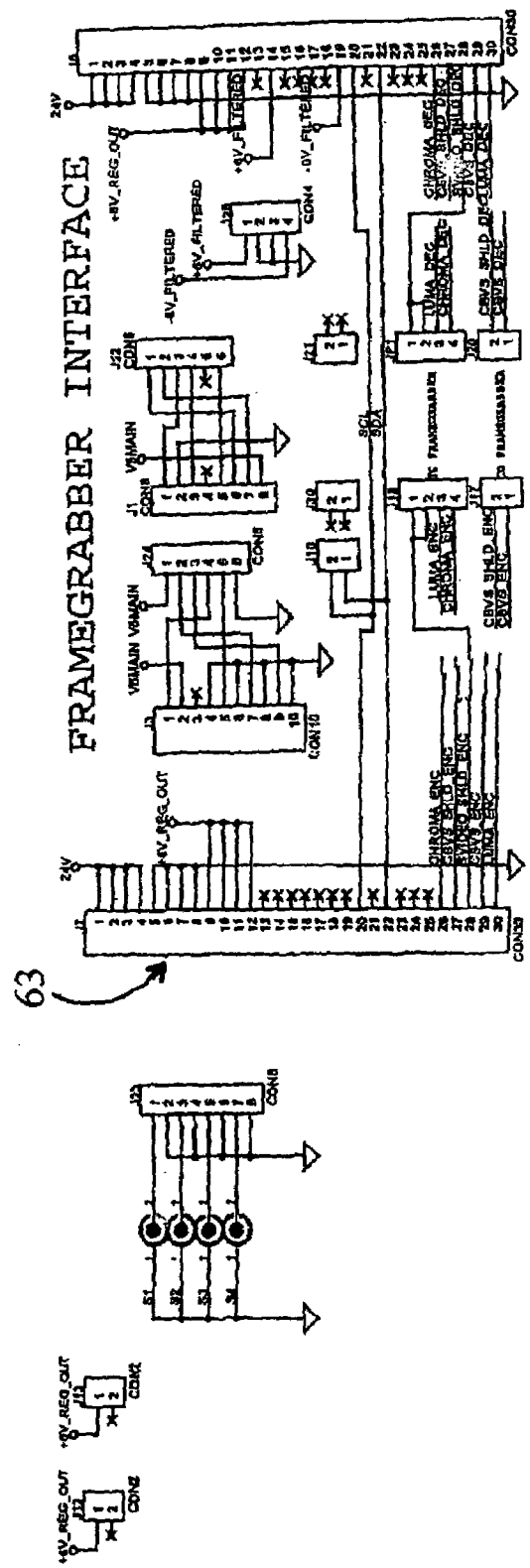
FIG. 6 is the schematic drawing of the circuit diagram of the frame-grabber of FIG. 1.
Figure 7:
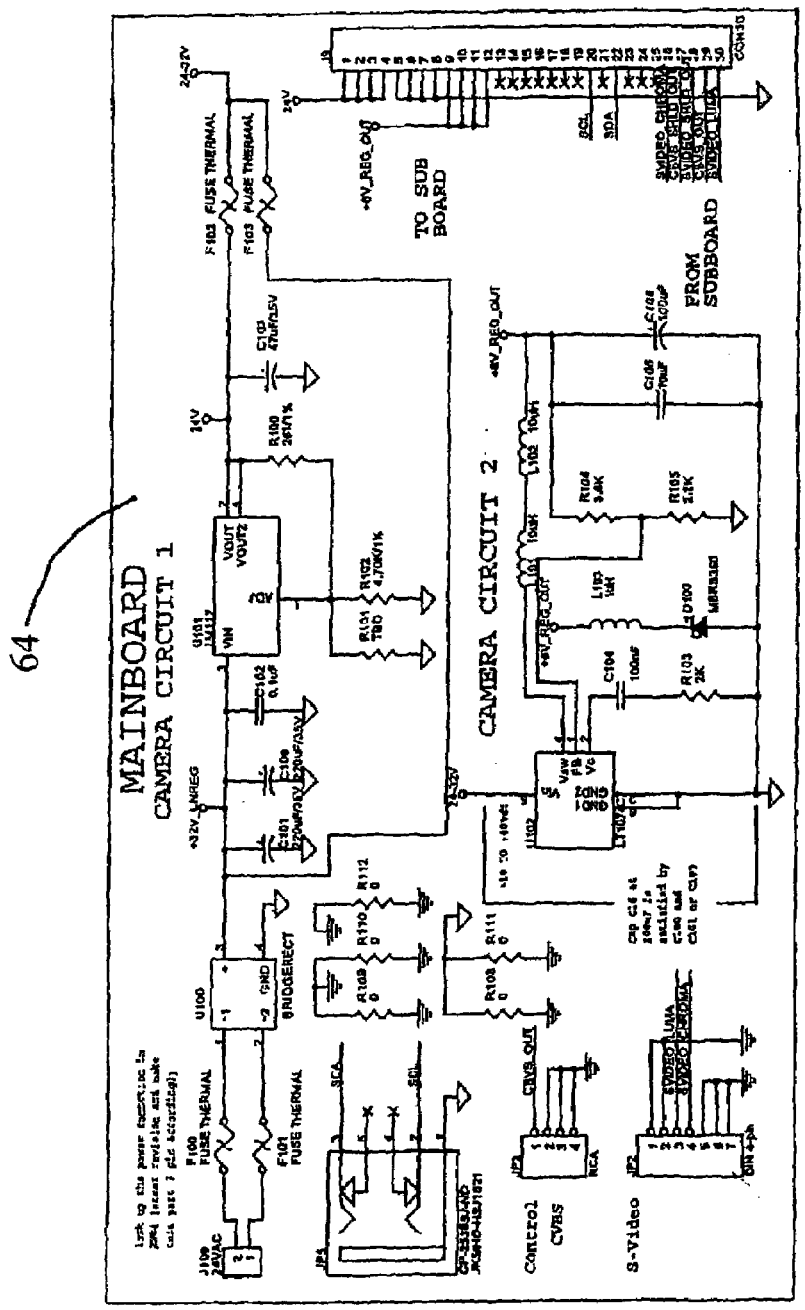
FIG. 7 is the schematic drawing of the circuit diagram of the power supply of FIG. 1.
Figure 7:
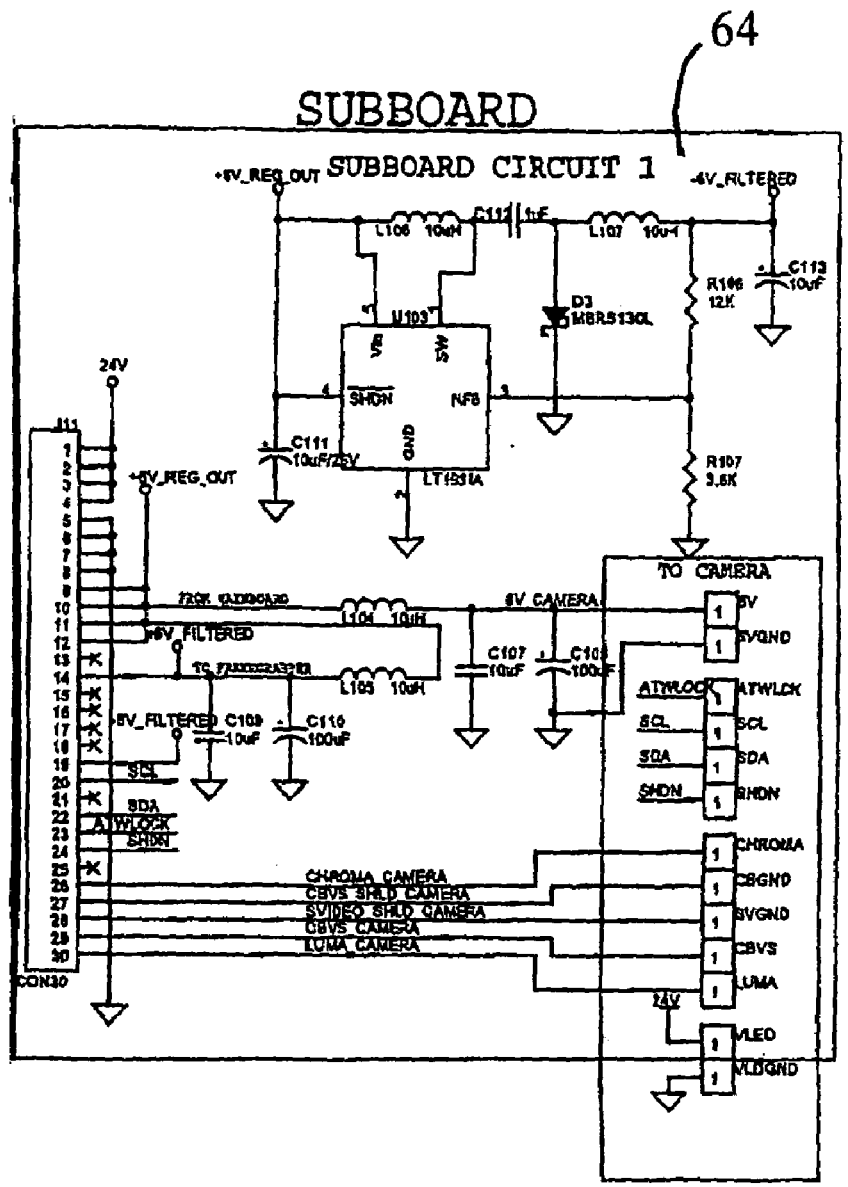

Referring to FIG. 6 in conjunction with FIG. 5 and FIG. 7 a circuit module 60 has a second connector 61, a complement-second connector 62. The circuit module 60 also includes a frame grabber interface circuit 63 and a camera power supply circuit 64. The frame grabber interface circuit 63 electrically couples the dental camera 20 to the monitor 11. The camera power supply circuit 64 electrically couples the dental camera 20 to the power supply 13.

From the foregoing it can be seen that a cable assembly with a circuit module for a frame grabber for electrically coupling a monitor and a power supply to a dental video camera has been described. It should be noted that the sketches are not drawn to scale and that distances of and between the figures are not to be considered significant.

Accordingly it is intended that the foregoing disclosure and showing made in the drawing shall be considered only as an illustration of the principle of the present invention.

What is claimed is:

1. A cable assembly for a dental video camera system with a dental video camera with a camera cable and a camera connector, a monitor with a monitor cable and a monitor connector and a power supply with power supply cable and a power supply connector, a said cable assembly comprising:
   a. an input housing;
   b. a first connector disposed in said input housing whereby the camera cable is electrically coupled to said first connector;
   c. a camera cable with a complement camera connector whereby said the complement-camera connector electrically couples the dental video camera through the camera connector to said camera cable;
   d. a circuit module;
   e. a second connector disposed in said circuit module;
   f. a complement-second connector disposed in said circuit module; and
   g. a frame grabber interface circuit disposed in said circuit module wherein said frame grabber interface circuit electrically couples the dental camera to the monitor.

2. A cable assembly according to claim 1 wherein said cable assembly includes a frame grabber interface circuit disposed in said circuit module wherein said frame grabber interface circuit electrically couples the dental camera to the monitor.

3. A cable assembly according to claim 2 wherein said cable assembly includes a camera power supply circuit whereby said camera power supply circuit electrically couples the dental camera to the power supply.

* * * * *